United States Patent
Chuang et al.

(10) Patent No.: US 7,447,366 B2
(45) Date of Patent: Nov. 4, 2008

(54) APPARATUS AND RELATED METHOD FOR IMAGE PROCESSING

(75) Inventors: Hsin-Jung Chuang, Taipei (TW); Jin-Jou Chen, Taipei (TW); Ming-Hsiu Chien, Taipei (TW); Sheng-Hung Tsao, Taipei (TW)

(73) Assignee: Lite-On It Corporation, Hsinchu (TW)

( * ) Notice: Subject to any disclaimer, the term of this patent is extended or adjusted under 35 U.S.C. 154(b) by 887 days.

(21) Appl. No.: 10/711,215

(22) Filed: Sep. 2, 2004

(65) Prior Publication Data

US 2005/0053286 A1   Mar. 10, 2005

(30) Foreign Application Priority Data

Sep. 4, 2003   (TW) ............................... 92124520 A

(51) Int. Cl.
*G06K 9/36* (2006.01)
*G06K 9/46* (2006.01)

(52) U.S. Cl. ................. 382/233; 382/282; 382/296; 382/298

(58) Field of Classification Search ................. 382/233, 382/240, 282, 298, 296
See application file for complete search history.

(56) References Cited

U.S. PATENT DOCUMENTS 6,546,155 B1 *   4/2003   Krishnamachari .......... 382/296
2003/0067627 A1 *   4/2003   Ishikawa et al. ........... 358/1.15

* cited by examiner

*Primary Examiner*—Phuoc Tran
(74) *Attorney, Agent, or Firm*—Winston Hsu

(57) ABSTRACT

The present invention discloses an apparatus and a method for image processing. According to the selected range by users, a cutting unit is added in the apparatus to trim the selected portion from an input image file. To reduce the CPU's loading and to increase the speed of image processing, design of the elements in the presented apparatus is a pipeline structure. In this way, images can be displayed smoothly on the screen.

7 Claims, 2 Drawing Sheets

APPARATUS AND RELATED METHOD FOR IMAGE PROCESSING

BACKGROUND OF INVENTION

1. Field of the Invention

The present invention relates to an apparatus and a method for image processing, and more particularly, to an apparatus and a method for image processing with a cutting unit.

2. Description of the Prior Art

Nowadays, most image processing depends on CPU operations. Image processing requires a huge amount of operations, and therefore is a heavy burden on a CPU whether in computer or in image player applications.

Please refer to FIG. 1. FIG. 1 is a block diagram of a prior art image processing apparatus 100. The conventional image processing apparatus 100 comprises a CPU 10, a frame buffer 20, a compressed file (CF) 30, a random access memory (RAM) 50, and a video encoder 40.

Generally, the CPU 10 performs a decoding operation on the compressed file 30 after receiving the compressed file 30. One example of a compressed file is a JPEG (Joint Photographic Experts Group) file. The CPU 10 decodes all compressed files and stores the files in the RAM 50 pixel by pixel.

In the prior art, image cutting is performed after decoding. For instance, according to the selected range of display, the CPU 10 sieves out the pixels corresponding to the selected range of display in the RAM 50, and loads the pixels from the RAM 50. Afterward, the CPU performs resizing and rotation operations on the pixels according to a user setting, and then stores the processed image data in the frame buffer 20. Finally, the video encoder 40 encodes the processed image data stored in the frame buffer 20 and outputs to a computer display or a TV screen (not shown in FIG. 1).

However, every image processing operation (including decoding operations), needs to be performed by the CPU 10 alone. Especially when performing image cutting, the CPU 10 needs to process a huge amount of pixels. Therefore, these special image processing operations ordered by users bring a heavy burden to the CPU 10, consequently it is likely that the display of the computer monitor or the TV screen will be adversely affected. These kinds of products will not be attractive to consumers.

SUMMARY OF INVENTION

It is therefore a primary objective of the claimed invention to provide an apparatus and a method for image processing.

Briefly described, the claimed invention discloses an apparatus and a method for image processing. An apparatus for image processing comprises an input First-In-First-Out buffer for receiving a compressed file, a decoding core for decoding the compressed file and outputting a decoded file as a plurality of code units, a cutting unit for selecting a portion of the code units corresponding to a specified range of display, a resizing unit for performing a rotation or a resizing operation on the portion of code units, a frame buffer for receiving a processed image data from the resizing unit and a digital video encoder for converting the processed image data into a digital video signal. Moreover, the method includes receiving a plurality of code units, and receiving a range of display information and choosing a portion of the plurality of code units according to the range of display information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
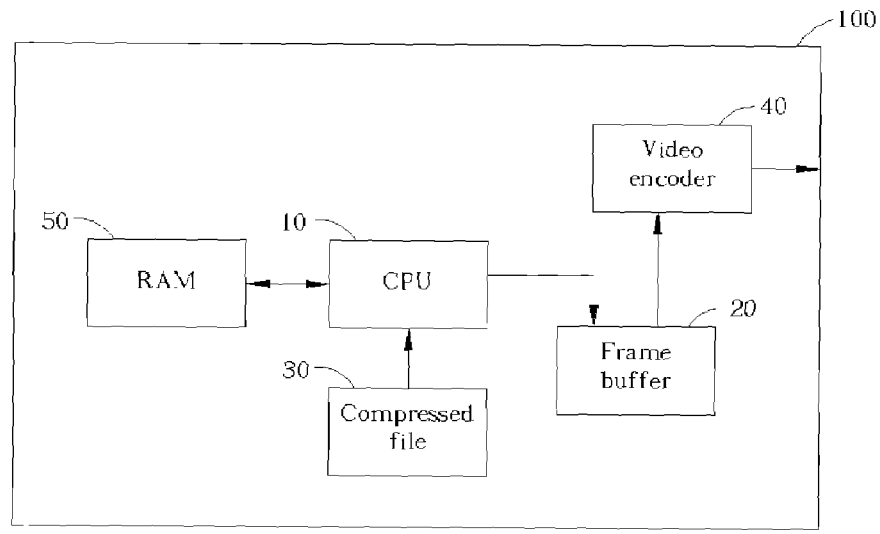
FIG. 1 is a block diagram of a prior art image processing apparatus.
Figure 2:
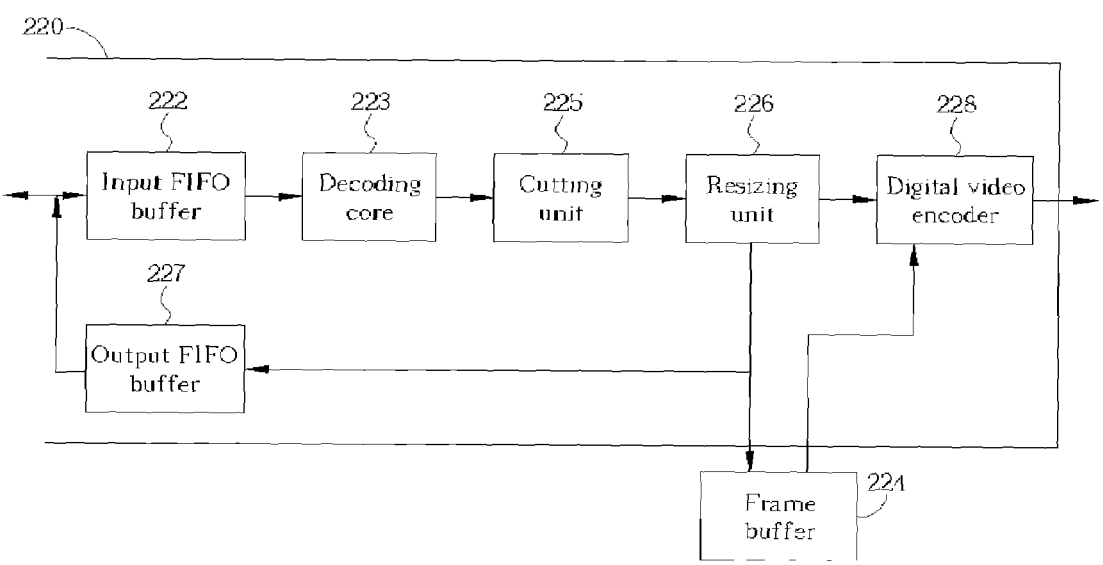
FIG. 2 is a block diagram of the present invention image processing apparatus.

The claimed invention introduces an apparatus for image processing. Please refer to FIG. 2. FIG. 2 is a block diagram of the present invention image processing apparatus 220 adopted in a video player. The image processing apparatus 220 is an integrated chip including an input First-In-First-Out (FIFO) buffer 222, a decoding core 223, a cutting unit 225, a resizing unit 226, a frame buffer 224, an output FIFO buffer 227, and a digital video encoder 228. According to the embodiment of the claimed invention, the decoding core 220 is a JPEG decoder, and the input compressed file is a JPEG file.

In the present invention, when a compressed file is input to a CPU, the CPU does not perform any operation but transmits the compressed file to the decoding core 220 directly. The input FIFO buffer 222 is utilized to temporarily store the compressed file. The decoding core 223 is utilized to decode the compressed file for transmitting the decoded file as minimum code units (MCUs), MCU by MCU to the cutting unit 225. The cutting unit 225 is capable of selecting a specified range of display according to a user setting, and transmitting the MCUs corresponding to the specified range of display to the resizing unit 226 for performing a resizing operation or a rotation operation. The processed image data is stored in the frame buffer 224. The digital video encoder 228 is capable of converting the image data stored in the frame buffer 224 into digital video signals and outputting them. Moreover, the output FIFO buffer 227 is utilized to receive the output image data of the cutting unit 225 and the resizing unit 226, and outputting the processed image data back to the CPU by the command of the CPU.

Figure 3:
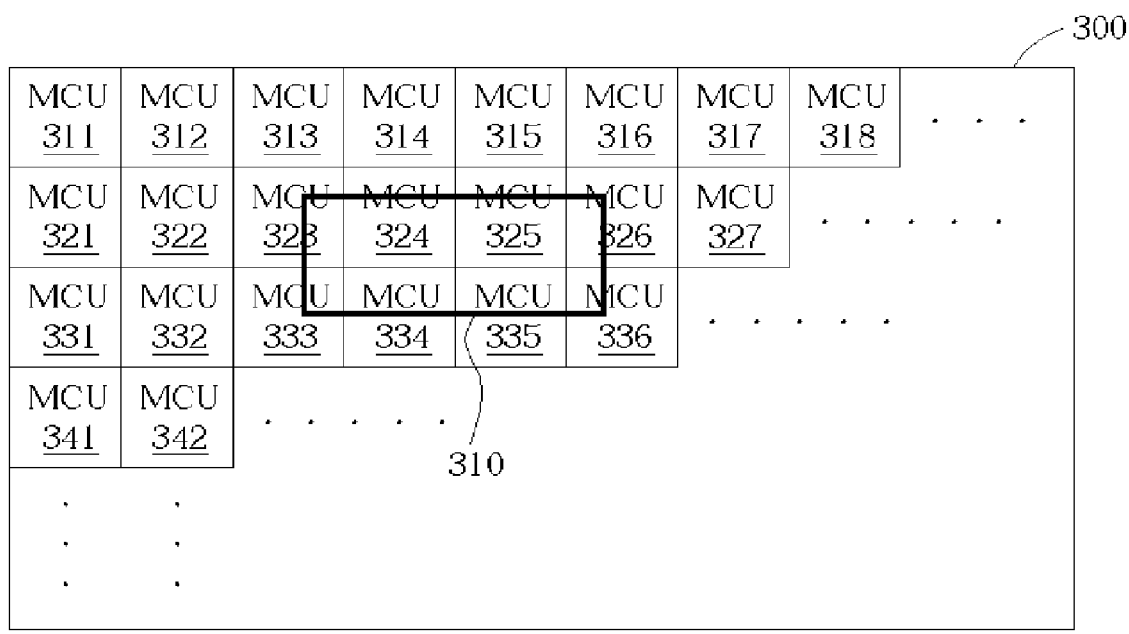
FIG. 3 is a diagram of a frame with all minimum code units (MCUs) within a frame.

Usually, the format and the parameters of the compressed file are stored in the sampling factor in the header of the JPEG file. When the JPEG file is input to the decoding core 223, the decoding core 223 generates MCU data according to the sampling factor, and all the MCU data generated from the compressed file may form a frame. Please refer to FIG. 3. FIG. 3 is a diagram of a frame 300 with all MCUs featured within it. Please also refer to FIG. 2. The decoding core 223 outputs all MCUs in the frame 300 in order. Subsequently, the CPU outputs information about the selected range of display 310 to the cutting unit 225. Therefore, the cutting unit 225 is capable of selecting MCU data corresponding to the selected range of display according to the information output by the CPU. For example, the selected range of display 310 in the frame 300 contains MCU323, MCU324, MCU325, MCU326, MCU333, MCU334, MCU335, and MCU336. Therefore, the cutting unit 225 is capable of performing cutting operations to the MCUs specified above. That is, the cutting unit 225 selects the range of display 310 only, and discards other MCUs beyond the range of display 310. This way, unnecessary image processing operations are reduced. Following the discarding of out-of-range MCUs, the MCUs selected by the cutting unit 225 are input to the resizing unit 226, and the resizing unit 226 may perform resizing operations or rotation operations or other special operations to the MCUs within the range of display 310. The processed image data may be stored in the frame buffer 224, and the digital video encoder 228 may read the image data stored in the frame buffer 224, perform encoding, generate digital video signals and output the digital video signals to the image processing apparatus 220. According to the embodiment of the claimed invention, the digital video encoder 228 is an ITU-R656 digital video encoder.

According to the present invention, when the JPEG file is input to the CPU, the CPU outputs the JPEG file to the decoding core and outputs a plurality of MCUs to the cutting unit 225. The cutting unit 225 selects a specific number of MCUs and outputs the selected MCUs to the next stage, the resizing unit, for special processing.

The present invention integrates the cutting unit 225 into the image processing apparatus 220. According to the pipelined cutting unit 225 in the image processing apparatus 220, when a JPEG file is input, the decoded image of the JPEG file may be obtained after processing of each device, and the MCUs may be delivered to the cutting unit 225 for image cutting processing. Decoding and image cutting operations are no longer performed by the CPU alone. Therefore, for the CPU, the burden of image processing is reduced substantially. Hence, the display of the computer monitor or the TV screen is less likely to be adversely affected.

Furthermore, the cutting unit 225 performs operations on the decoded image file MCUs, MCU by MCU. The number of operations involved in the present invention method is much lower than the number of operations involved when performing operations pixel by pixel, as in the prior art. The speed of image processing is increased as well.

In summary, the advantage of the claimed invention is the reduction of the burden on the CPU, and the speeding up of image processing by utilizing a cutting unit.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An apparatus for image processing, comprising:
   an input First-In-First-Out buffer for receiving a compressed file;
   a decoding core for decoding the compressed file and outputting a decoded file as a plurality of code units;
   a cutting unit for selecting a portion of the code units corresponding to a specified range of display;
   a resizing unit for performing a rotation or a resizing operation on the portion of code units;
   a frame buffer for receiving a processed image data from the resizing unit; and
   a digital video encoder for converting the processed image data into a digital video signal.

2. The apparatus of claim 1 further comprising an output First-In-First-Out buffer for outputting the processed image data back to a central processing unit (CPU) by the command of the CPU.

3. The apparatus of claim 1 wherein the code unit is a minimum code unit (MCU).

4. The apparatus of claim 1 wherein an information about the range of display is output from the CPU.

5. The apparatus of claim 1 wherein the compressed file is a JPEG file.

6. The apparatus of claim 1 wherein a sample factor is stored in the compressed file.

7. The apparatus of claim 6 wherein the sample factor comprising a format and a plurality of parameters associated with the compressed file.

* * * * *